US010810074B2

(12) United States Patent
Yu et al.

(10) Patent No.: US 10,810,074 B2
(45) Date of Patent: Oct. 20, 2020

(54) UNIFIED ERROR MONITORING, ALERTING, AND DEBUGGING OF DISTRIBUTED SYSTEMS

(71) Applicant: Microsoft Technology Licensing, LLC, Redmond, WA (US)

(72) Inventors: Yan Yu, Cupertino, CA (US); Ionut Constandache, Sunnyvale, CA (US); Brent D. Miller, Sunnyvale, CA (US); Scott M. Meyer, Berkeley, CA (US); Bogdan G. Arsintescu, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 99 days.

(21) Appl. No.: 16/226,405

(22) Filed: Dec. 19, 2018

(65) Prior Publication Data
US 2020/0201699 A1   Jun. 25, 2020

(51) Int. Cl.
| G06F 11/00 | (2006.01) |
| G06F 11/07 | (2006.01) |
| G06F 11/30 | (2006.01) |
| G06F 11/34 | (2006.01) |
| G06F 11/32 | (2006.01) |
| G06F 9/54  | (2006.01) |

(52) U.S. Cl.
CPC ............ *G06F 11/079* (2013.01); *G06F 9/542* (2013.01); *G06F 11/0709* (2013.01); *G06F 11/0766* (2013.01); *G06F 11/3006* (2013.01); *G06F 11/3075* (2013.01); *G06F 11/3082* (2013.01); *G06F 11/3086* (2013.01); *G06F 11/32* (2013.01); *G06F 11/3409* (2013.01); *G06F 11/3476* (2013.01); *G06F 2201/835* (2013.01); *G06F 2201/86* (2013.01)

(58) Field of Classification Search
CPC ............... G06F 11/079; G06F 11/0775; G06F 11/0781; G06F 11/3636; G06F 11/321; G06F 11/3476; G06F 11/327
See application file for complete search history.

(56) References Cited

U.S. PATENT DOCUMENTS

| 9,798,607 B1* | 10/2017 | Kulkarni ............. G06F 11/0778 |
| 2011/0154117 A1* | 6/2011 | Danielson ........... G06F 11/0748 714/37 |
| 2016/0041894 A1* | 2/2016 | Reid, III ................ A63F 13/60 714/45 |
| 2016/0055044 A1* | 2/2016 | Kawai ................... G06N 20/00 714/26 |

* cited by examiner

*Primary Examiner* — Charles Ehne
(74) *Attorney, Agent, or Firm* — Hickman Palermo Becker Bingham LLP

(57) ABSTRACT

The disclosed embodiments provide a system for performing unified error monitoring, alerting, and debugging of distributed systems. During operation, the system receives logs of activity within a distributed system over event streams in a distributed streaming platform. Upon identifying an error in the received logs, the system collects, from the event streams, log entries generated within a time window of the error into a contextual log associated with the error. The system then outputs an alert containing metadata for accessing the contextual log.

20 Claims, 5 Drawing Sheets

UNIFIED ERROR MONITORING, ALERTING, AND DEBUGGING OF DISTRIBUTED SYSTEMS

BACKGROUND

Field

The disclosed embodiments relate to error monitoring, alerting, and debugging. More specifically, the disclosed embodiments relate to techniques for performing unified error monitoring, alerting, and debugging of distributed systems.

Related Art

Distributed system performance is important to the operation and success of many organizations. For example, a company may provide websites, web applications, mobile applications, databases, content, and/or other services or resources through hundreds or thousands of servers in multiple data centers around the globe. An anomaly or failure in a server or data center may disrupt access to a service or a resource, potentially resulting in lost business for the company and/or a reduction in consumer confidence that results in a loss of future business. For example, high latency in loading web pages from the company's website may negatively impact the user experience with the website and deter some users from returning to the website.

On the other hand, web-based resources and/or other distributed systems may complicate the accurate detection and analysis of performance anomalies, errors, and failures. For example, the overall performance of a website may be affected by the interdependent execution of multiple services that provide data, images, video, user-interface components, recommendations, and/or features used in the website. When one component of the website experiences an anomaly, the performance of multiple other components of the website may be affected. Moreover, a developer and/or other user performing root cause analysis of the anomaly may be required to manually retrieve and analyze a large number of log files from machines on which the components execute before the log files are overwritten.

BRIEF DESCRIPTION OF THE FIGURES

In the figures, like reference numerals refer to the same figure elements.

DETAILED DESCRIPTION

Figure 1:
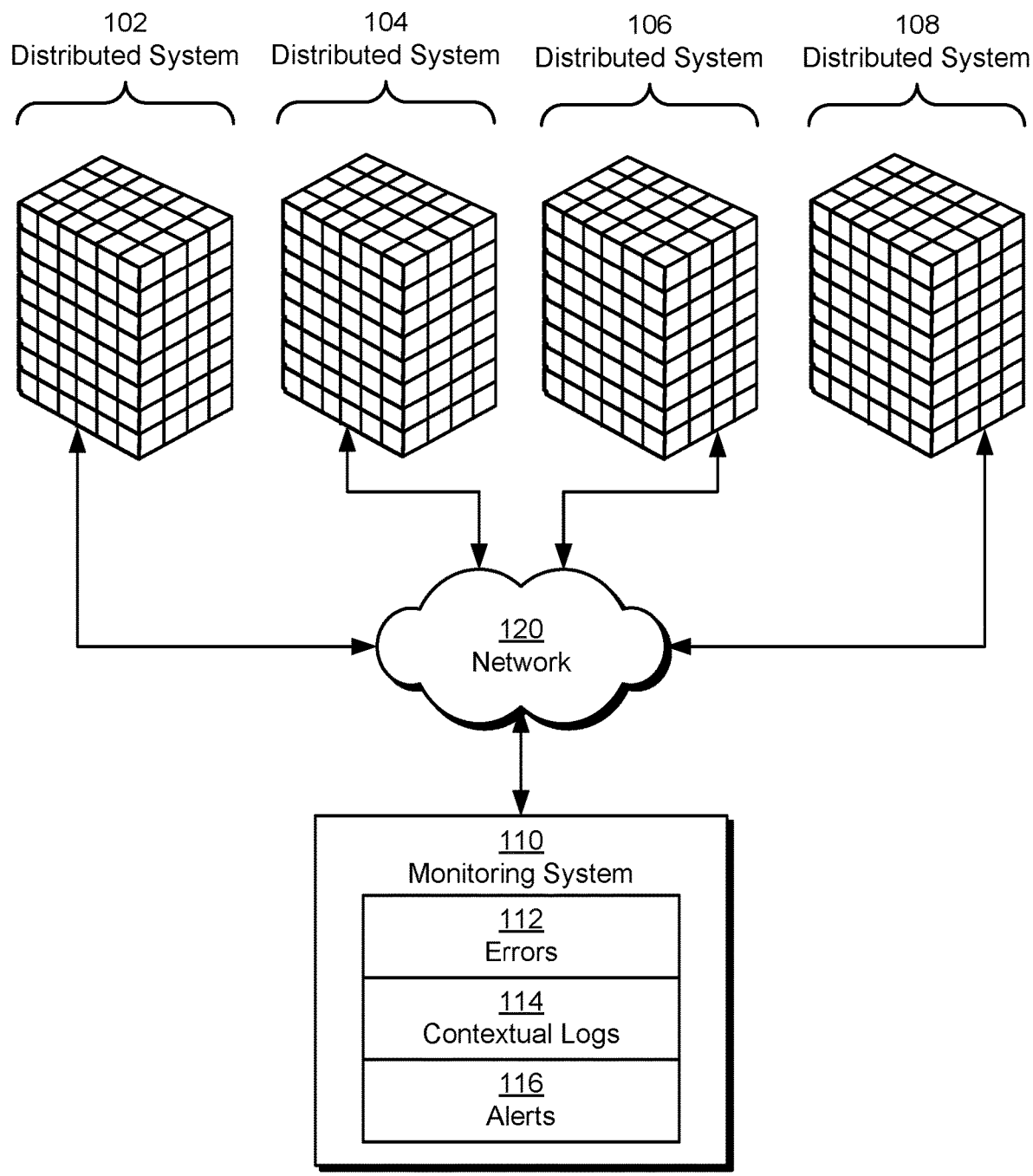
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a method, apparatus, and system for performing unified error monitoring, alerting, and debugging of distributed systems. In these embodiments, a distributed system includes multiple applications, services, processes, and/or other components executing on a set of machines. To perform tasks within the distributed system, the components communicate, synchronize, and/or collaborate with one another over a network. As a result, an error, anomaly, and/or issue experienced by one component of a distributed system may be caused by and/or affect other nodes in the distributed system.

To improve monitoring, alerting, and debugging of errors in a distributed system, a monitoring system receives messages and/or events containing records of the errors (e.g., failures, anomalies, issues, etc.) over event streams in a distributed streaming platform. The monitoring system also receives messages and/or events containing records of log entries from machines in the distributed system over the event streams.

When a record of an error is received over an event stream, the monitoring system aggregates log entries that are generated within a time window of the error and/or that match one or more attributes associated with the error. For example, the monitoring system may search event streams in the distributed streaming platform for log entries that were generated within five seconds of the error, from the same cluster as the error, from the same branch of service calls (e.g., during processing of a request) as the error, and/or from the same session as the error.

Next, the monitoring system standardizes the aggregated log entries and generates a contextual log from the standardized log entries. For example, the monitoring system may add standardized timestamps, host names, cluster names, log file names, and/or other metadata fields to the log entries and store the log entries within one or more files in the same location (e.g., a directory representing the contextual log). As a result, the contextual log may include contextual information from various parts of the distributed system that aid in diagnosing the root cause of the error.

The monitoring system then generates an alert of the error and/or contextual log. For example, the monitoring system may send the alert to a developer, site reliability engineer (SRE), and/or another user involved in managing or maintaining the distributed system. The alert may include a link to the contextual log, a path to the location of the contextual log, and/or other metadata for accessing the contextual log. The user may use the metadata to view the contents of the contextual log and/or access a user interface for interacting with the contextual log.

By creating and outputting contextual logs that standardize and aggregate log entries across a distributed system in response to errors in the distributed system, the disclosed embodiments may improve the timeliness and/or effectiveness with which root cause analysis and resolution of the errors are performed. Such aggregation of log entries from remote logs may further reduce overhead associated with logging to local disks and/or minimize interruptions to hosts in the distributed system during debugging of errors on the hosts. In contrast, conventional techniques may require users to manually collect logs from individual machines in a distributed system before the logs are overwritten. Moreover, the logs may occupy limited storage space on the machines, and querying of the logs to analyze and debug errors may interfere with the execution of tasks on the machines. Consequently, the disclosed embodiments may improve applications, computer systems, and/or technologies for monitoring, alerting, debugging, managing, and/or executing distributed systems.

Unified Error Monitoring, Alerting, and Debugging of Distributed Systems

FIG. 1 shows a schematic of a system in accordance with the disclosed embodiments. As shown in FIG. 1, the system includes a monitoring system 110 that monitors a number of distributed systems 102-108 for errors 112. For example, distributed systems 102-108 may include applications, services, processes, and/or other software components executing on clusters, data centers, collocation centers, cloud computing systems, content delivery networks, and/or other collections of hosts and/or other hardware resources (e.g., processors, storage devices, memory, network devices, input/output (I/O) devices, etc.). The software components may perform tasks by communicating and/or coordinating with one another over a network 120 such as a local area network (LAN), wide area network (WAN), personal area network (PAN), virtual private network, intranet, cellular network, Wi-Fi network (Wi-Fi® is a registered trademark of Wi-Fi Alliance), Bluetooth (Bluetooth is a registered trademark of Bluetooth SIG, Inc.) network, universal serial bus (USB) network, Ethernet network, and/or switch fabric.

More specifically, monitoring system 110 includes functionality to generate contextual logs 114 and alerts 116 related to errors 112. As described in further detail below, contextual logs 114 include contextual information that helps users perform root cause analysis, debugging, and/or other tasks related to managing and mitigating the effects of errors 112 on the execution of distributed systems 102-108. In turn, alerts 116 include information that allows the users to access contextual logs 114 and respond to errors 112 in a timely fashion.

Figure 2:
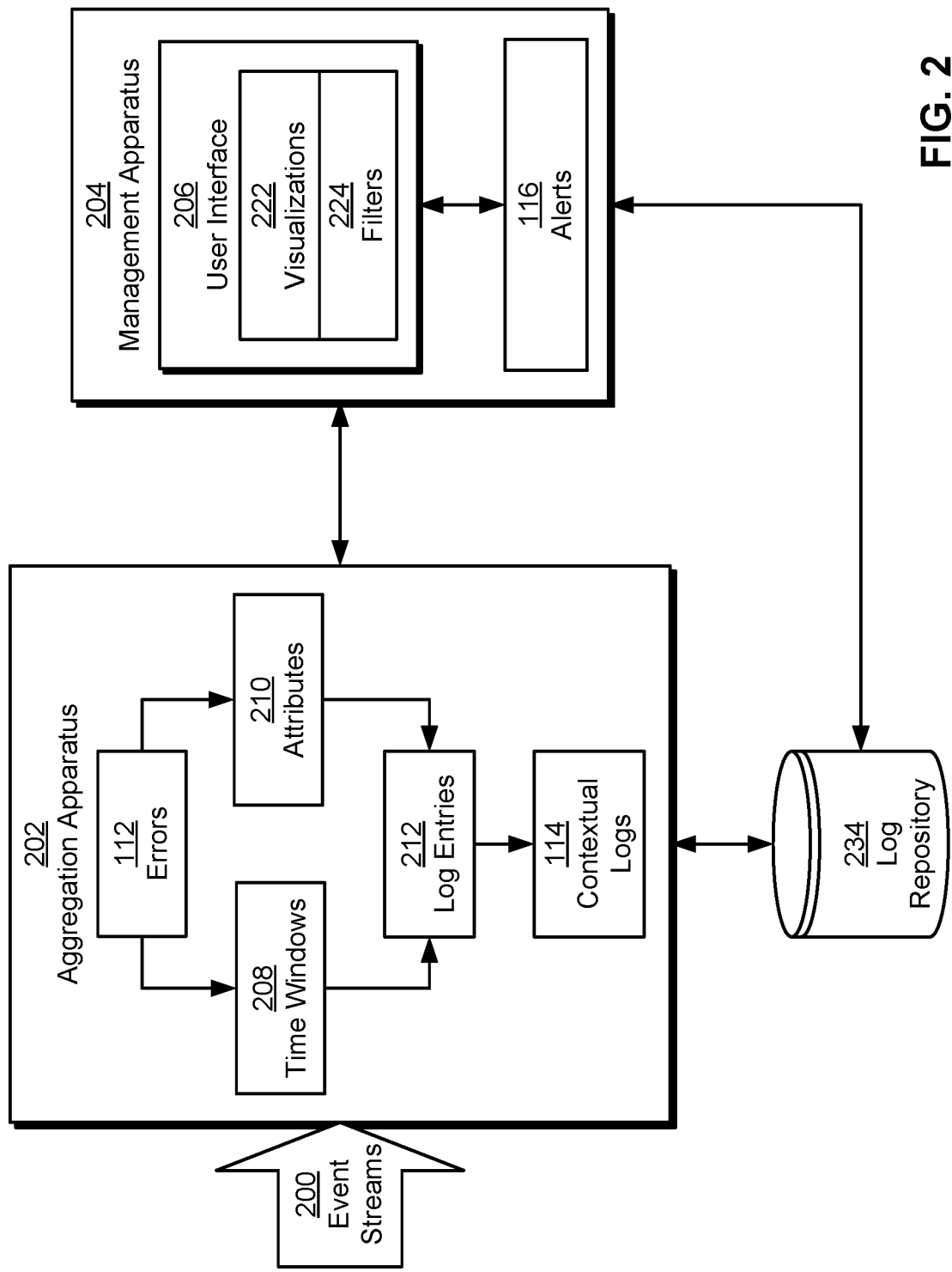
FIG. 2 shows a system for performing unified error monitoring, alerting, and debugging of a distributed system in accordance with the disclosed embodiments.

FIG. 2 shows a system for performing unified error monitoring, alerting, and debugging of a distributed system in accordance with the disclosed embodiments. More specifically, FIG. 2 shows a monitoring system (e.g., monitoring system 110 of FIG. 1) that detects errors 112 in a distributed system, generates contextual logs 114 related to errors 112, and outputs alerts 116 related to errors 112 and contextual logs 114. As shown in FIG. 2, the system includes an aggregation apparatus 202 and a management apparatus 204. Each of these components is described in further detail below.

Aggregation apparatus 202 includes functionality to monitor a number of event streams 200 for records of errors 112 within the distributed system. Errors 112 may be represented by exceptions, logged errors, segmentation faults, fatal errors, crashes, core dumps, and/or other anomalies associated with components in the distributed system. Errors 112 may also be generated by different sources in the distributed system, such as different applications, processes, and/or programming language platforms in which the components are written and/or execute.

In response to an error on a host, a monitoring mechanism executing on the host and/or on a different host generates an event, ticket, and/or another record of the error and transmits the record over one or more event streams 200. Aggregation apparatus 202 receives the record over event streams 200 and identifies the error by analyzing the record and/or matching the record to a given event stream. For example, aggregation apparatus 202 may detect the error by finding an error code in the record. In another example, aggregation apparatus 202 may determine that an error has occurred after receiving the record of the error over an event stream, ticketing system, and/or error reporting system that is configured to communicate only errors in the distributed system.

In one or more embodiments, event streams 200 are generated and/or maintained using a distributed streaming platform such as Apache Kafka (Kafka™ is a registered trademark of the Apache Software Foundation). When a service call, transaction, error, and/or other recent activity occurs within a distributed system, a publisher in the distributed streaming platform writes a record of the activity to one or more event streams 200. Fields in the record may include, but are not limited to, a timestamp of the activity, a duration of the activity, a "tree" identifier (ID) that is propagated across a tree of service calls during processing of a request, a service ID for a service performing a call related to the activity and/or a service being called to perform the activity, a user ID for a user for whom the activity is performed, a session ID for a session during which the activity is performed, a host name of a host on which the activity is performed, and/or an error code. The distributed streaming platform may then propagate the record to components subscribing to event streams 200, such as aggregation apparatus 202. In other words, event streams 200 may allow activity occurring on multiple nodes of a distributed system to be captured and transmitted in a unified, scalable manner.

Aggregation apparatus 202 uses additional records in event streams 200 to generate contextual logs 114 related to errors 112. As mentioned above, the additional records include log entries 212 of other, non-anomalous activity and/or events (e.g., service calls, transactions, operations, etc.) in the distributed system. The additional records may also, or instead, include log entries 212 related to monitoring of machine states in the distributed system. For example, the records may include metrics, statistics, and/or parameters related to processes or threads running on a machine, resource usage (e.g., processor usage, memory usage, storage usage, I/O usage, network usage, etc.) on the machine, a network status on the machine, and/or a socket status on the machine.

More specifically, aggregation apparatus 202 aggregates log entries 212 related to errors 112 into contextual logs 114 for errors 112. Each contextual log may include a centralized location and/or collection of log entries 212 related to a given error. For example, each contextual log may be assigned to a directory, and one or more log files containing log entries 212 related to the corresponding error may be stored in the directory.

To improve the relevance of log entries 212 in the contextual log to the error, aggregation apparatus 202 restricts timestamps of log entries 212 to fall within a time window (e.g., time windows 208) of the error. For example, aggregation apparatus 202 may collect, from event streams 200, log entries 212 with timestamps that fall within a certain number of seconds of the error (e.g., within + or − five seconds of the error).

Aggregation apparatus 202 may also, or instead, filter log entries 212 in the contextual log by one or more attributes 210 related to the error. For example, aggregation apparatus 202 may populate the contextual log with log entries 212 that have the same cluster ID, tree ID, session ID, and/or user ID as the error. In another example, aggregation apparatus 202 may identify a query that triggered a core dump and aggregate log entries 212 with the same tree ID and/or cluster ID as the query into the contextual log.

After log entries 212 related to the error are identified and/or retrieved from event streams 200, aggregation apparatus 202 standardizes metadata fields in log entries 212 and/or files containing log entries 212. For example, aggregation apparatus 202 may add standardized timestamps to log entries 212 by converting timestamps in log entries 212 to UNIX epoch time. In another example, aggregation apparatus 202 may update each log entry and/or each file in the contextual log with the host name of a host in which the corresponding activity occurred, the cluster name of a cluster in which the corresponding activity occurred, and/or the log file name of a log file in which the log entry was originally found.

An example log entry in a contextual log may include the following representation:

11539650987014086 WRITER-000.log lor1-app32063 I1016 00:49:47.014086 15166 branch.h:144] [TOTAL] Input Graph Size 2—Input Tuples 1—Input Edges 1

The first three fields in the representation above contain standardized metadata that is added by aggregation apparatus 202. The first field of "11539650987014086" includes a standardized timestamp in UNIX epoch time, the second field of "WRITER-000.log" specifies a log file name for the log entry, and the third field of "lor1-app32063" specifies the host name of the host in which the log entry was generated. The remainder of the log entry includes the details of the activity represented by the log entry, such as a component affected by and/or performing the activity (i.e., "branch.h") and a description of the activity (i.e., "[TOTAL] Input Graph Size 2—Input Tuples 1—Input Edges 1").

An example log file containing the log entry may have a filename of "lor1-app32063-broker-liquid-server.cluster.1.log." The filename includes the host name of "lor1-app32063" followed by a host type of "broker" and a cluster name of "liquid-server.cluster.1." As a result, the filename may provide additional context and/or information related to log entries in the log file.

After a contextual log for an error is generated, aggregation apparatus 202 stores the contextual log in a log repository 234. For example, aggregation apparatus 202 may create a separate log file for each host from which log entries associated with the error were collected. Aggregation apparatus 202 may then store all log files associated with the error in a directory representing the contextual log within a distributed filesystem, database, cloud storage system, and/or other data store providing log repository 234.

In response to newly created contextual logs 114, aggregation apparatus 202 and/or management apparatus 204 generate alerts 116 of contextual logs 114. For example, management apparatus 204 may receive notifications of newly generated contextual logs from aggregation apparatus 202 after the contextual logs are created. In response to the notifications, management apparatus 204 may output alerts 116 of the new contextual logs 114 to developers, SREs, and/or other users involved in managing or maintaining the distributed system. Each alert may include a link for accessing one or more contextual logs 114 within a user interface 206, a path to a location of each contextual log in log repository 234, and/or other metadata that can be used by the user to access the contextual log(s).

Management apparatus 204 also provides user interface 206, which allows users to view and/or interact with the content of contextual logs 114. For example, user interface 206 may include a graphical user interface (GUI), web-based user interface, and/or other type of user interface that is accessed by clicking on links within alerts 116. In another example, management apparatus 204 may include a remote server that provides user interface 206 as a command line interface (CLI) that allows users to input commands for accessing log repository 234 and/or another source of contextual logs 114. The users may interact with the CLI to navigate to paths containing contextual logs 114 and use UNIX commands such as "grep" and/or "awk" to search and/or filter the contents of contextual logs 114.

In one or more embodiments, management apparatus 204 includes functionality to display one or more visualizations 222 of contextual logs 114 within user interface 206. Visualizations 222 may include, but are not limited to, sequence diagrams of events in contextual logs 114 (e.g., events leading up to an error), waterfall diagrams that illustrate the timing and/or duration of tasks (e.g., transactions, system calls, operations, etc.) in contextual logs 114, time-based orderings of events in contextual logs 114, and/or other graphical representations of data in contextual logs 114. Visualizations 222 may also, or instead, include visual cues that assist in diagnosing errors, such as highlighting or flagging of log entries and/or events that are potential root causes of the errors (e.g., input queries before core dumps and/or timeout exceptions and any errors in between the input queries and core dumps and/or timeout exceptions). As a result, visualizations 222 may allow users to identify and/or understand relationships among events, applications, processes, hosts, and/or other entities in the distributed system.

Management apparatus 204 also includes functionality to update visualizations 222 based on filters 224 specified through user interface 206. For example, the users may interact with user-interface elements (e.g., buttons, sliders, drop-down menus, text boxes, etc.) of a GUI and/or input text-based commands to a CLI to specify parameters related to sorting, grouping, and/or other operations on log entries in contextual logs 114. The parameters may include, but are not limited to, log file names, host names, times and/or time ranges, processes, logging sources (e.g., applications, programming language platforms, operating systems, etc.), classes of error (e.g., error codes), and/or durations of execution. In turn, management apparatus 204 may update visualizations 222 to reflect the specified operations.

By creating and outputting contextual logs that standardize and aggregate log entries across a distributed system in response to errors in the distributed system, the disclosed embodiments may improve the timeliness and/or effectiveness with which root cause analysis and resolution of the errors are performed. Such aggregation of log entries from remote logs may further reduce overhead associated with logging to local disks and/or minimize interruptions to hosts in the distributed system during debugging of errors on the hosts. In contrast, conventional techniques may require users to manually collect logs from individual machines in a distributed system before the logs are overwritten. Moreover, the logs may occupy limited storage space on the machines, and querying of the logs to analyze and debug errors may interfere with the execution of tasks on the machines. Consequently, the disclosed embodiments may improve applications, computer systems, and/or technologies for monitoring, alerting, debugging, managing, and/or executing distributed systems.

Those skilled in the art will appreciate that the system of FIG. 2 may be implemented in a variety of ways. First, aggregation processing apparatus 202, management apparatus 204, and log repository 234 may be provided by a single physical machine, multiple computer systems, one or more virtual machines, a grid, one or more databases, one or more filesystems, and/or a cloud computing system. Aggregation apparatus 202 and management apparatus 204 may additionally be implemented together and/or separately by one or more hardware and/or software components and/or layers.

Second, various techniques may be used to obtain records of errors 112 and/or log entries 212 from multiple hosts and/or nodes in the distributed system. For example, a change data capture (CDC) pipeline may be configured to propagate changes to logs that are locally stored on hosts in the distributed system to aggregation apparatus 202 and/or other components of the system, in lieu of or in addition to a distributed streaming platform.

Figure 3:
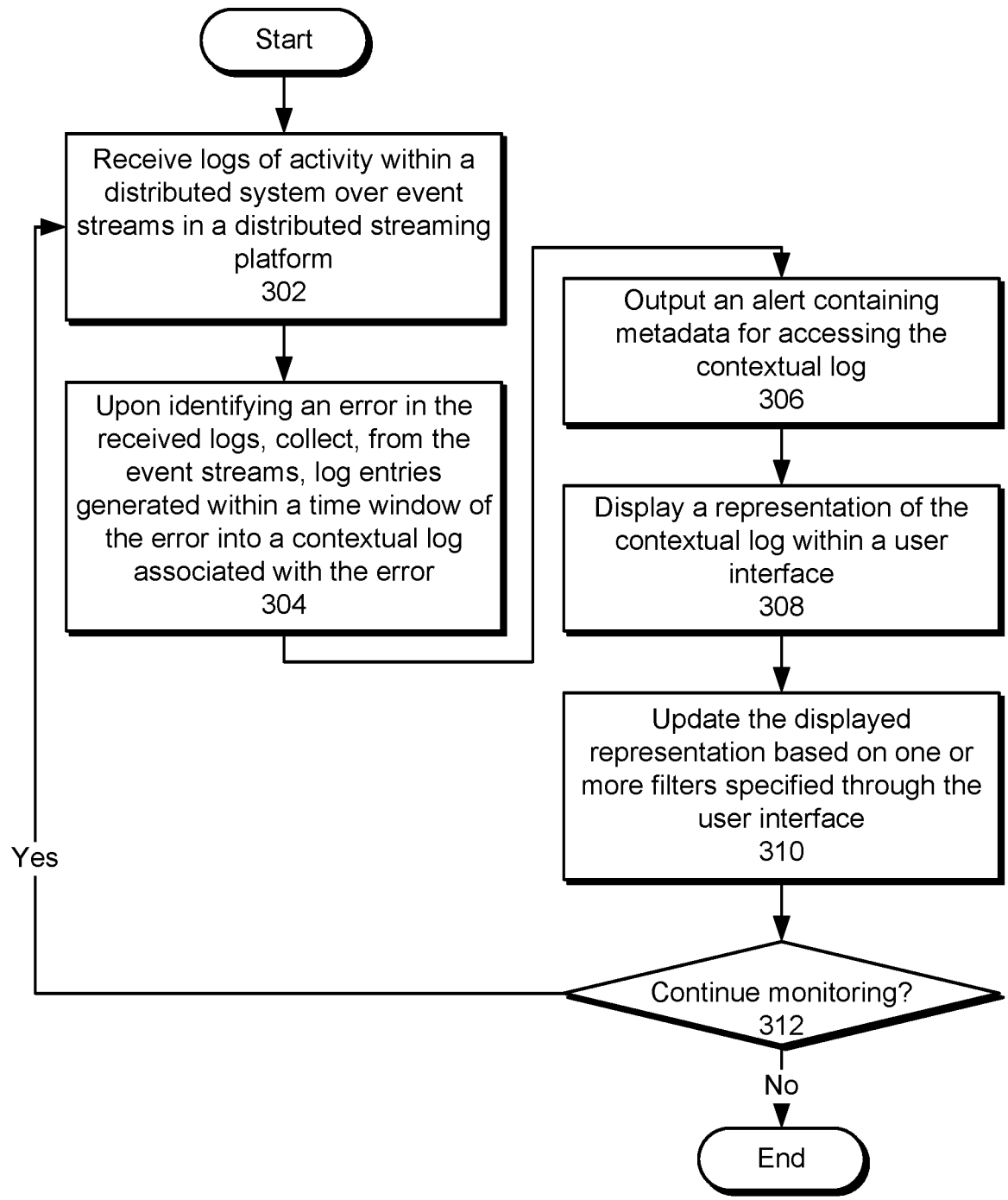
FIG. 3 shows a flowchart illustrating a process of performing unified error monitoring, alerting, and debugging of a distributed system in accordance with the disclosed embodiments.

FIG. 3 shows a flowchart illustrating a process of performing unified error monitoring, alerting, and debugging of a distributed system in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, logs of activity within a distributed system are received over event streams in a distributed streaming platform (operation 302). For example, hosts in the distributed system may write the logs to one or more topics in an Apache Kafka distributed streaming platform, and subscribers to the topic(s) may read the logs from one or more partitions associated with each topic. The logs may include log entries from applications in the distributed system (e.g., logs of operations, service calls, transactions, and/or other tasks performed by the applications) and/or log entries containing machine states (e.g., processes running on a machine, resource usage, network status, socket status, etc.) in the distributed system.

Upon identifying an error in the received logs, log entries generated within a time window of the error are collected from the event streams into a contextual log associated with the error (operation 304), as described in further detail below with respect to FIG. 4. An alert containing metadata for accessing the contextual log is also generated (operation 306). For example, the alert may be transmitted to a developer, SRE, and/or other user involved in managing and/or maintaining the distributed system. The alert may include a link to a user interface for accessing the contextual log, a path of the contextual log, and/or other information that can be used to view, retrieve, and/or interact with the contextual log.

A representation of the contextual log is displayed within a user interface (operation 308). Continuing with the previous example, the user may click on the link in the alert to load the contextual log within the user interface. In turn, the user interface may display a visualization of events represented by the log entries, visual indications of potential root causes of the error, and/or a time-based ordering of the log entries to the user.

The displayed representation is also updated based on one or more filters specified through the user interface (operation 310). For example, the user may interact with user-interface elements and/or specify commands for sorting, filtering, grouping, and/or otherwise updating the displayed contextual log based on attributes such as log file name, host name, time, process, logging source, class of error, and/or duration of execution.

Operations 302-310 may be repeated while the distributed system is being monitored (operation 312). For example, contextual logs of errors may be generated and provided to users (operations 302-310) in a timely manner while the distributed system is used to perform tasks.

Figure 4:
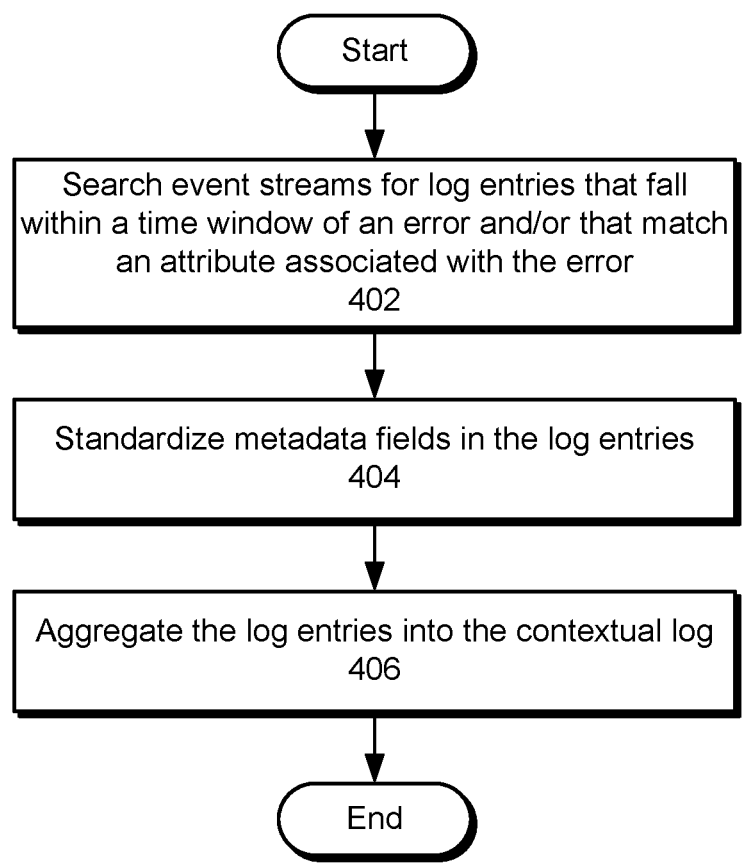
FIG. 4 shows a flowchart illustrating a process of generating a contextual log for an error in a distributed system in accordance with the disclosed embodiments.

FIG. 4 shows a flowchart illustrating a process of generating a contextual log for an error in a distributed system in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, event streams are searched for log entries that fall within a time window of an error and/or that match an attribute associated with the error (operation 402). As mentioned above, the event streams may aggregate log entries from multiple hosts in the distributed system into one or more topics. Records from the event streams may be analyzed to find log entries that are generated within a certain number of seconds of the error and/or that identify a cluster in which the error was generated, a tree of service calls related to the error, and/or a session associated with the error.

Next, metadata fields in the log entries are standardized (operation 404). For example, standardized versions of timestamps, host names, cluster names, log file names, and/or other attributes may be added to the log entries and/or filenames of files containing the log entries.

The log entries are then aggregated into the contextual log (operation 406). For example, the log entries may be written into one or more files (e.g., a separate file per host in the distributed system), and the files may be stored in a common directory and/or location representing the contextual log. The location of the contextual log may then be transmitted in an alert and/or other communication to a user for subsequent review by the user, as discussed above.

Figure 5:
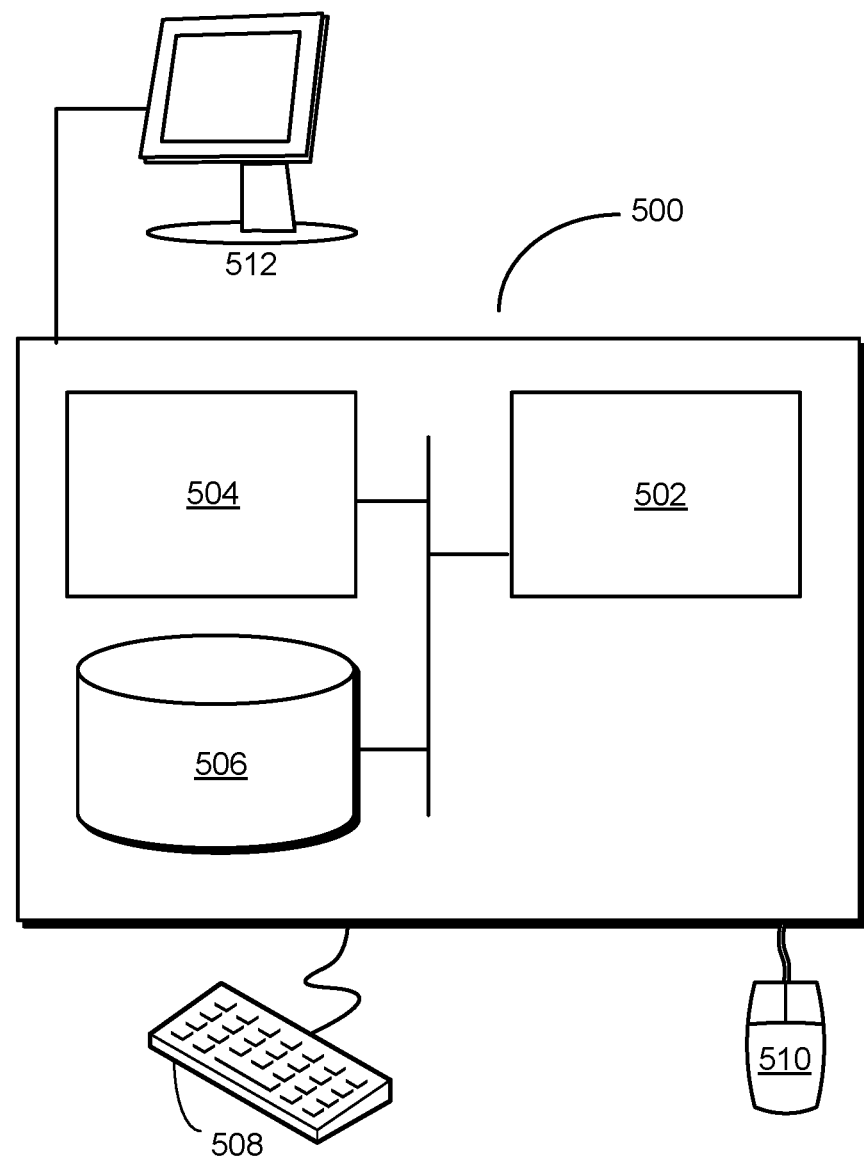
FIG. 5 shows a computer system in accordance with the disclosed embodiments.

FIG. 5 shows a computer system 500 in accordance with the disclosed embodiments. Computer system 500 includes a processor 502, memory 504, storage 506, and/or other components found in electronic computing devices. Processor 502 may support parallel processing and/or multithreaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for performing unified error monitoring, alerting, and debugging of a distributed system. The system includes an aggregation apparatus and a management apparatus, one or more of which may alternatively be termed or implemented as a module, mechanism, or other type of system component. The aggregation apparatus receives logs of activity within a distributed system over event streams in a distributed streaming platform. Upon identifying an error in the received logs, the aggregation apparatus collects, from the event streams, log entries generated within a time window of the error into a contextual log associated with the error. The management apparatus then outputs an alert containing metadata for accessing the contextual log. The management apparatus also displays a representation of the contextual log within a user interface and/or updates the displayed representation based on one or more filters specified through the user interface.

In addition, one or more components of computer system 500 may be remotely located and connected to the other components over a network. Portions of the present embodiments (e.g., aggregation apparatus, monitoring apparatus, log repository, monitoring system, distributed system, etc.) may also be located on different nodes of a distributed system that implements the embodiments. For example, the present embodiments may be implemented using a cloud computing system that performs monitoring, alerting, and debugging of errors in remote distributed systems.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
   receiving, by one or more computer systems, a plurality of logs of activity within a distributed system over a plurality of event streams in a distributed streaming platform;
   upon identifying an error in the plurality of logs, collecting, by the one or more computer systems from the plurality of event streams, a plurality of log entries, generated within a time window of the error, into a contextual log associated with the error;
   wherein the plurality of log entries includes (a) a first log entry from a first event stream of the plurality of event streams and (b) a second log entry from a second event stream of the plurality of event streams;
   wherein collecting comprises:
      searching the plurality of event streams for log entries that fall within the time window of the error and match an attribute associated with the error, wherein searching the plurality of event streams results in identifying the plurality of log entries; and
      aggregating the plurality of log entries into the contextual log; and
   outputting, by the one or more computer systems, an alert comprising metadata for accessing the contextual log.

2. The method of claim 1, further comprising:
   displaying a representation of the contextual log within a user interface; and
   updating the displayed representation based on one or more filters specified through the user interface.

3. The method of claim 2, wherein the representation of the contextual log comprises at least one of:
   a visualization of events represented by the log entries;
   a visual indication of a potential root cause of the error; or
   a time-based ordering of the log entries.

4. The method of claim 2, wherein the one or more filters comprise at least one of:
   a log file name;
   a host name;
   a time;
   a process;
   a logging source;
   a class of error; or
   a duration of execution.

5. The method of claim 1, wherein the log entries comprise:
   an application log entry; or
   a machine state entry.

6. The method of claim 5, wherein the machine state entry comprises at least one of:
   processes running on a machine;
   a resource usage;
   a network status; or
   a socket status.

7. The method of claim 1, wherein the error comprises at least one of:
   an exception;
   a logged error; or
   a core dump.

8. The method of claim 1, wherein the metadata comprises at least one of:
   a link to the contextual log; or
   a path to a location of the contextual log.

9. A system, comprising:
   one or more processors; and
   memory storing instructions that, when executed by the one or more processors, cause the system to:
      receive a plurality of logs of activity within a distributed system over a plurality of event streams in a distributed streaming platform;
      upon identifying an error in the plurality of logs, collect, from the plurality of event streams, into a contextual log associated with the error, a plurality of log entries generated within a time window of the error;
      wherein the plurality of log entries includes (a) a first log entry from a first event stream of the plurality of event streams and (b) a second log entry from a second event stream of the plurality of event streams; wherein collecting comprises:

searching the plurality of event streams for log entries that fall within the time window of the error and match an attribute associated with the error, wherein searching the plurality of event streams results in identifying the plurality of log entries; and aggregating the plurality of log entries into the contextual log; and output an alert comprising metadata for accessing the contextual log.

10. The system of claim 9, wherein the memory further stores instructions that, when executed by the one or more processors, cause the system to:

display a representation of the contextual log within a user interface; and update the displayed representation based on one or more filters specified through the user interface.

11. The system of claim 10, wherein the representation of the contextual log comprises at least one of:

a visualization of events represented by the log entries;

a visual indication of a potential root cause of the error; or a time-based ordering of the log entries.

12. The system of claim 10, wherein the one or more filters comprise at least one of:

a log file name;

a host name;

a time;

a process;

a logging source;

a class of error; or a duration of execution.

13. The system of claim 9, wherein collecting the log entries comprises:

standardizing metadata fields in the log entries.

14. The system of claim 13, wherein the metadata fields comprise at least one of:

a timestamp;

a host name;

a cluster name; or a log file name.

15. A non-transitory computer-readable storage medium storing instructions that when executed by a computer cause the computer to perform a method, the method comprising:

receiving a plurality of logs of activity within a distributed system over a plurality of event streams in a distributed streaming platform;

upon identifying an error in the the plurality of logs, collecting, from the plurality of event streams, a plurality of log entries generated within a time window of the error into a contextual log associated with the error;

outputting an alert comprising metadata for accessing the contextual log;

displaying a representation of the contextual log within a user interface; and updating the displayed representation based on one or more filters specified through the user interface.

16. The method of claim 15, wherein collecting the log entries within the time window of the error into the contextual log associated with the error comprises:

searching the event streams for the log entries that fall within the time window of the error and match an attribute associated with the error; and aggregating the log entries into the contextual log.

17. The method of claim 16, wherein collecting the log entries within the time window of the error into the contextual log associated with the error further comprises:

standardizing metadata fields in the log entries prior to aggregating the log entries into the contextual log.

18. The method of claim 17, wherein the metadata fields comprise at least one of:

a timestamp;

a host name;

a cluster name; or a log file name.

19. The method of claim 16, wherein the attribute comprises at least one of:

a cluster in which the error was generated;

a tree of service calls related to the error; or a session associated with the error.

20. The non-transitory computer-readable storage medium of claim 19, wherein the representation of the contextual log comprises at least one of:

a visualization of events represented by the log entries;

a visual indication of a potential root cause of the error; or a time-based ordering of the log entries.

* * * * *